US008600048B1

(12) United States Patent
Hansen et al.

(10) Patent No.: US 8,600,048 B1
(45) Date of Patent: Dec. 3, 2013

(54) FORMAT-TRANSLATING ENCRYPTION SYSTEMS

(75) Inventors: Chad B. Hansen, Simi Valley, CA (US);
Jacob Green, Santa Monica, CA (US);
Michael S. Leong, Redwood City, CA (US)

(73) Assignee: Voltage Security, Inc., Cupertino, CA (US)

( * ) Notice: Subject to any disclaimer, the term of this patent is extended or adjusted under 35 U.S.C. 154(b) by 365 days.

(21) Appl. No.: 13/154,272

(22) Filed: Jun. 6, 2011

Related U.S. Application Data

(60) Provisional application No. 61/359,260, filed on Jun. 28, 2010.

(51) Int. Cl.
*G06F 21/00* (2013.01)

(52) U.S. Cl.
USPC .................................. 380/28; 380/30; 380/42

(58) Field of Classification Search
USPC .......................................................... 380/28
See application file for complete search history.

(56) References Cited

U.S. PATENT DOCUMENTS

| | | | |
|---|---|---|---|
| 6,845,159 B1 * | 1/2005 | Domstedt et al. ............... | 380/44 |
| 7,774,746 B2 * | 8/2010 | Mansfield et al. ............ | 717/106 |
| 8,208,627 B2 | 6/2012 | Pauker et al. | |
| 2010/0211798 A1 * | 8/2010 | Fahrny .......................... | 713/189 |
| 2011/0081015 A1 * | 4/2011 | Parker et al. .................... | 380/28 |
| 2011/0103579 A1 * | 5/2011 | Martin et al. ................... | 380/28 |
| 2012/0039469 A1 | 2/2012 | Mueller et al. | |

OTHER PUBLICATIONS

Bellare, M., Ristenpart, T., Rogaway, P., Stegers, T.: Format-preserving encryption. In: Jacobson Jr., M.J., Rijmen, V., Safavi-Naini, R. (eds.) SAC 2009. LNCS, vol. 5867, pp. 295-312. Springer, Heidelberg (2009).*
Black et al., Ciphers with Arbitrary Finite Domains, Feb. 12, 2001 (16 pages).

* cited by examiner

*Primary Examiner* — Yogesh Paliwal
(74) *Attorney, Agent, or Firm* — Treyz Law Group; G. Victor Treyz (57) ABSTRACT

Format-translating encryption (FTE) cryptographic operations may be implemented using a cryptographic system that translates plaintext strings to ciphertext strings of a different format and that translates ciphertext strings to plaintext strings of a different format. Plaintext strings may have a format defined by a first regular expression. Corresponding ciphertext strings may have a format defined by a second regular expression that is different than the first regular expression. During encryption operations, a format-translating encryption algorithm may employ a format-preserving encryption (FPE) encryption algorithm. During decryption operations, a format-translating encryption algorithm may employ an FPE decryption algorithm.

20 Claims, 7 Drawing Sheets

FORMAT-TRANSLATING ENCRYPTION SYSTEMS

This application claims the benefit of provisional patent application No. 61/359,260, filed Jun. 28, 2010, which is hereby incorporated by reference herein in its entirety.

BACKGROUND

This invention relates to cryptography and more particularly, to cryptographic techniques that support format translation.

Cryptographic systems are used to secure data in a variety of contexts. For example, encryption algorithms are used to encrypt sensitive information such as financial account numbers, social security numbers, and other personal information. By encrypting sensitive data prior to transmission over a communications network, the sensitive data is secured, even if it passes over an unsecured communications channel. Sensitive data is also sometimes encrypted prior to storage in a database. This helps to prevent unauthorized access to the sensitive data by an intruder.

Commonly used encryption algorithms include the Advanced Encryption Standard (AES) encryption algorithm and the Data Encryption Standard (DES) encryption algorithm. These conventional encryption algorithms can significantly alter the format of a data item. For example, encryption of a numeric string such as a credit card number may produce a string that contains non-numeric characters or a string with a different number of characters. Because the format of the string is altered by the encryption process, it may not be possible to store the encrypted string in the same type of database table that is used to store unencrypted versions of the string, making it difficult or impossible to encrypt the entries in a database.

To address the problems associated with altering the format of a string during cryptographic operations, format-preserving encryption (FPE) algorithms have been proposed. When an FPE algorithm is used to encrypt or decrypt a string in a given format, the format of the string is not changed during the encryption or decryption process. This ensures that the length of the string and the character set for the string is unaffected by encryption and decryption operations.

Although FPE algorithms can be helpful in avoiding the disruptions associated with altered string formats, situations sometimes arise in which it would be desirable to change the length of the string and other string format attributes in a predictable way. For example, it might be desirable to shorten or lengthen a string to a particular length during encryption or decryption operations or it might be desirable to change one type of string into another as part of an encryption or decryption process.

It would therefore be desirable to be able to provide improved ways in which to cryptographically process data in a system.

SUMMARY

Format-translating encryption (FTE) systems may be used to encrypt plaintext strings to produce corresponding ciphertext strings. Ciphertext strings may be decrypted to produce plaintext. During encryption and decryption operations, the format of the strings may be changed.

The format of a plaintext sting may have a first format that is defined by a first regular expression. The format of a ciphertext string that is produced during encryption operations may have a second format that is defined by a second regular expression that is different than the first regular expression. During encryption, the plaintext may be encrypted to produce the ciphertext while translating the format of the string from the first format to a second format. During decryption, the ciphertext version of the string is decrypted to produce the plaintext version of the string while translating the second format to the first format.

The FTE systems may be used to translate variable-length plaintext strings into corresponding ciphertext strings with a fixed length. The FTE systems may also be used to perform complex string translation operations such as changing a telephone number into an email address or changing a social security number into a street address. Other suitable formats for the plaintext and ciphertext strings include formats for account numbers, addresses, strings of digits and letters with particular patterns, passwords, usernames, etc.

Further features of the invention, its nature and various advantages will be more apparent from the accompanying drawings and the following detailed description of the preferred embodiments.

DETAILED DESCRIPTION

Figure 1:
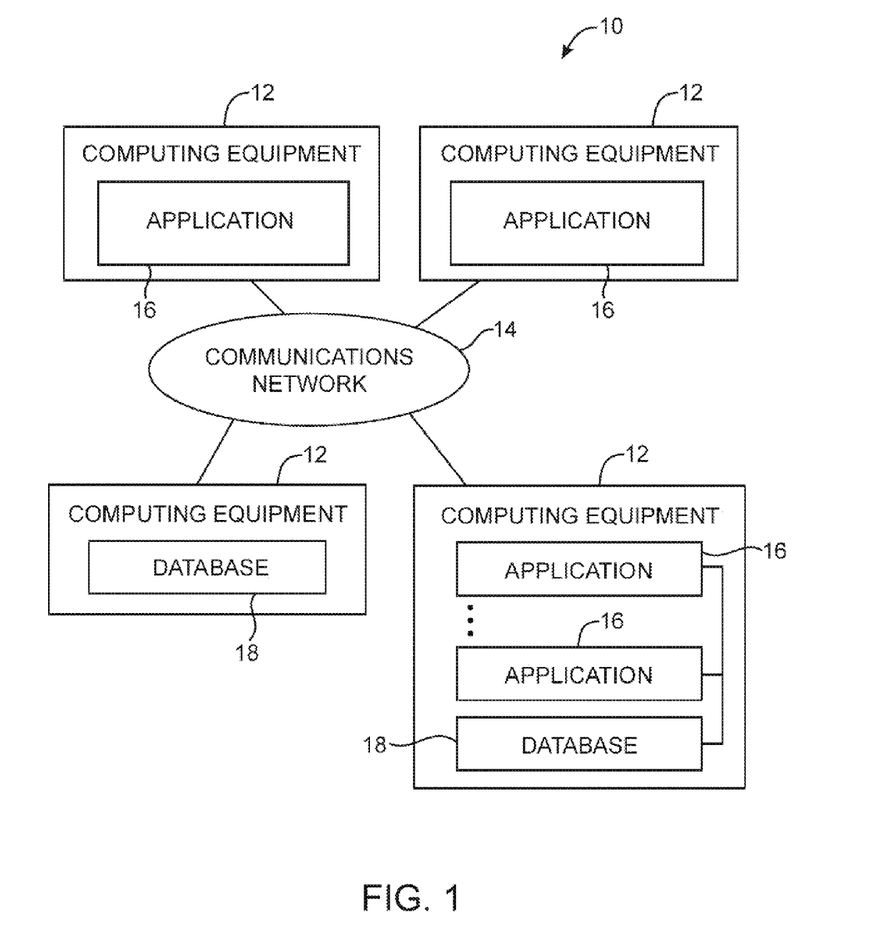
FIG. 1 is a diagram of an illustrative system environment in which cryptographic tools with format-translating cryptographic capabilities may be used in accordance with an embodiment of the present invention.

An illustrative cryptographic system 10 in accordance with the present invention is shown in FIG. 1. System 10 includes computing equipment 12 and communications network 14. The computing equipment 12 may include one or more personal computers, workstations, computers configured as servers, mainframe computers, portable computers, etc. The communications network 14 may be a local area network or a wide area network such as the internet. System 10 may be used in processing data for one or more organizations. Computing equipment 12 may be used to support applications 16 and databases 18. In computing equipment 12 in which multiple applications run on the same computer platform, applications and databases may communicate with each other directly. If desired, applications 16 can communicate with each other and with databases 18 remotely using communications network 14. For example, an application 16 that is run on a computer in one country may access a database 18 that is located in another country or an application 16 running on one computer may use network 14 to transmit data to an application 16 that is running on another computer. Applications 16 may be any suitable applications, such as financial services applications, governmental record management applications, medical record management applications, etc.

The data that is handled by system 10 includes sensitive items such as individuals' street addresses, social security numbers and other identification numbers, license plate numbers, passport numbers, financial account numbers such as credit card and bank account numbers, telephone numbers, email addresses, user names, passwords, biometric data, birthdates, and other sensitive information such as financial data, medical data, academic data, governmental records, etc. In some contexts, information such as individuals' names may be considered sensitive.

In a typical scenario, an organization may maintain a database 18 of customer information. The database lists each customer's name, address, account number, telephone number, email address, username, password, etc.

Representatives of the organization may be located in many different geographic locations. The representatives may use various applications 16 to access the database. For example, a sales associate may retrieve telephone numbers of customers using one application, whereas a customer service representative may retrieve account balance information using another application. Automated applications such as error-checking housekeeping applications may also require access to the database.

To prevent unauthorized access to sensitive data and to comply with data privacy regulations and other restrictions, sensitive data may need to be encrypted. Encryption operations may be performed before data is passed between applications 16 or before data is stored in a database 18. Because various applications may need to access different types of data, the system 10 preferably allows data to be selectively encrypted. As an example, each of the telephone numbers and each of the credit card numbers can be individually encrypted using separate cryptographic keys. With this type of selective encryption arrangement, applications that require access to telephone numbers need not be provided with access to credit card numbers and vice versa.

To support encryption and decryption operations in system 10, applications 16 may be provided with encryption and decryption engines. For example, an application 16 that accesses a database 18 over a communications network 14 may have an encryption engine for encrypting sensitive data before it is provided to the database 18 and stored and may have a decryption engine for use in decrypting encrypted data that has been retrieved from database 18 over communications network 14. As another example, a first application may have an encryption engine for encrypting sensitive data before passing the encrypted data to a second application. The second application may have a decryption engine for decrypting the encrypted data that has been received from the first application.

Any suitable technique may be used to provide applications 16 with encryption and decryption capabilities. For example, the encryption and decryption engines may be incorporated into the software code of the applications 16, may be provided as stand-alone applications that are invoked from within a calling application, or may be implemented using a distributed arrangement in which engine components are distributed across multiple applications and/or locations.

Figure 2:
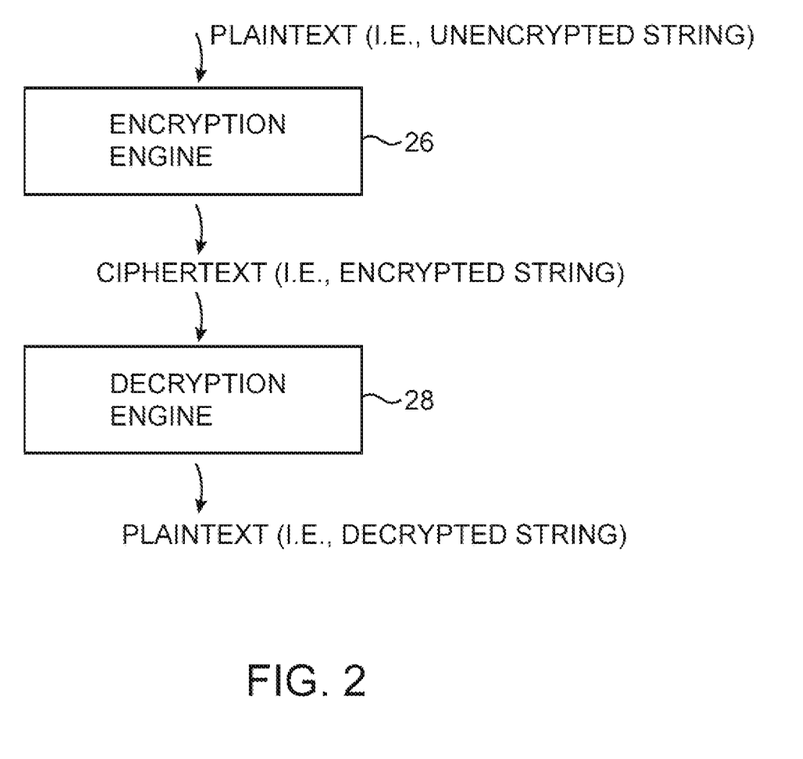
FIG. 2 is a diagram showing how encryption and decryption engines can be used in encrypting plaintext to produce ciphertext and can be used in decrypting ciphertext to produce plaintext in accordance with an embodiment of the present invention.

The data handled by the applications 16 and databases 18 of system 10 is represented digitally. The data includes strings of characters (i.e., names, addresses, account numbers, etc.). As shown in FIG. 2, during encryption operations, an encryption engine 26 that is implemented on the computing equipment of FIG. 1 encrypts unencrypted strings of characters (sometimes referred to as plaintext) into encrypted strings of characters (sometimes referred to as ciphertext). During decryption operations, a decryption engine 28 that is implemented on the computing equipment of FIG. 1 decrypts encrypted strings of characters (i.e., ciphertext) to form unencrypted strings of characters (i.e., plaintext).

The data strings that are handled in a typical data processing system have defined formats. For example, an identification number may be made up of three letters followed by ten digits. In some situations, format preserving encryption (FPE) algorithms may be used for supporting cryptographic operations. FPE algorithms do not alter the format of a string during encryption and decryption operations. As a result, a plaintext string that complies with a given format can be encrypted to form a corresponding ciphertext string that complies with the same given format. The use of FPE algorithms to encrypt data items can be useful in situations in which it is desired to encrypt and decrypt strings of a fixed length. For example, an FPE algorithm could be used to encrypt four-digit personal identification numbers. Because both the plaintext and ciphertext version of the personal identification numbers are compliant with the same format (i.e., both contain four numeric characters), the ciphertext version of the personal identification number can be stored in the same type of database table as the plaintext version, enhancing compatibility with legacy applications.

In some situations, the format preserving attribute of an FPE algorithm is not desired. For example, it may be desired to convert a plaintext social security number into a ciphertext string that resembles a different type of data item such as an email address. The two types of strings in this example use different formats. Social security numbers contain only digits and are nine characters long. Email addresses come in a variety of lengths and require use of the "@" symbol and an appropriate top level domain (e.g., ".com").

Figure 3:
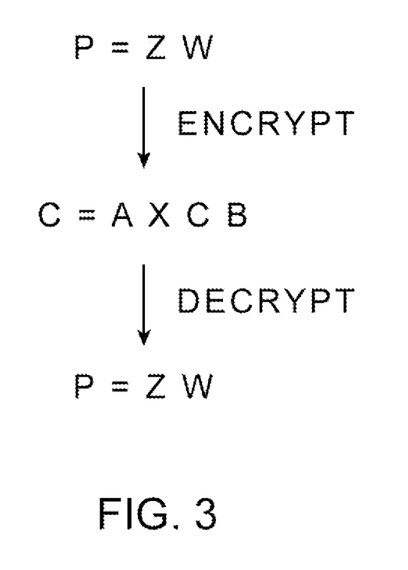
FIG. 3 is a diagram showing how the format of a string may be translated between one format and another as the string is encrypted and decrypted in a system of the type shown in FIG. 1 in accordance with an embodiment of the present invention.

As another example, it may be desirable to encrypt a plaintext password string that has one format to produce a ciphertext version of the password string in another format. Password formation rules may dictate that a valid password have from one to three letter characters. Using this format, a user might select a two-character password "ZW."During encryption, it may be desirable to encrypt the password to form a ciphertext version of the password that contains four letter characters. This type of scenario is illustrated in FIG. 3. Initially, a user selects a two-character password ("ZW"). During decryption, the password is encrypted to produce ciphertext (i.e., "AXCB"). The ciphertext represents an encrypted version of the original plaintext password "ZW" and is in a desired format (e.g., a four-character string). During decryption, the four-character ciphertext "AXCB" is decrypted to produce the two-character plaintext "ZW" (in this example).

In the FIG. 3 example, the plaintext password was supplied by a user in a first format (i.e., a variable-length string format that contains 1-3 letters). During encryption of the plaintext to form ciphertext, the string format was translated to a second format (i.e., a fixed-length four letter format). During decryption, the ciphertext is converted back to the original format. Other format conversion arrangements may be used if desired. The example of FIG. 3 is merely illustrative.

The ability to change the format of a string in a specified way as part of the encryption (or decryption) process, allows variable-length strings to be converted into fixed-length strings, allows the number and types of characters in a string to be adjusted, etc. This may facilitate handling of the strings in system 10.

Arrangements such as these in which the format of the string changes during application of a cryptographic algorithm (i.e., during encryption operations or during decryption operations) may sometimes be referred to as format-translating encryption (FTE) arrangements or format-translating cryptographic algorithms. This is because the initial format of a string is translated as that string is processed. If, for example, a plaintext social security number string is encrypted to form a ciphertext email address, the initial social security number format has been translated into an email format by virtue of the encryption process. Similarly, when decrypting the ciphertext email address to produce a corresponding plaintext social security number, format translation operations have been performed as part of the decryption process.

System 10 can implement format-translating encryption (FTE) encryption and decryption operations using a cryptographic algorithm that is based partly on a format-preserving encryption (FPE) algorithm.

In an FPE algorithm, cryptographic processes (e.g., an FPE engine) may be used to perform encryption and decryption without making format changes. An FPE algorithm may be implemented using the well known Luby-Rackoff construction or other suitable cryptographic function. The Luby-Rackoff construction is a method of using pseudo-random functions to produce a pseudo-random permutation (also sometimes referred to as a block cipher). A diagram showing how a block cipher using the Luby-Rackoff construction may be implemented is shown in FIG. 4.

During encryption operations, an unencrypted string (e.g., a bit string) is divided into two portions. The unencrypted string may be divided into two portions using any suitable scheme. For example, the string may be divided into odd and even portions by selecting alternating characters from the string for the odd portion and for the even portion. With another suitable approach, the unencrypted string is divided into two portions by splitting the string into left and right halves.

Figure 4:
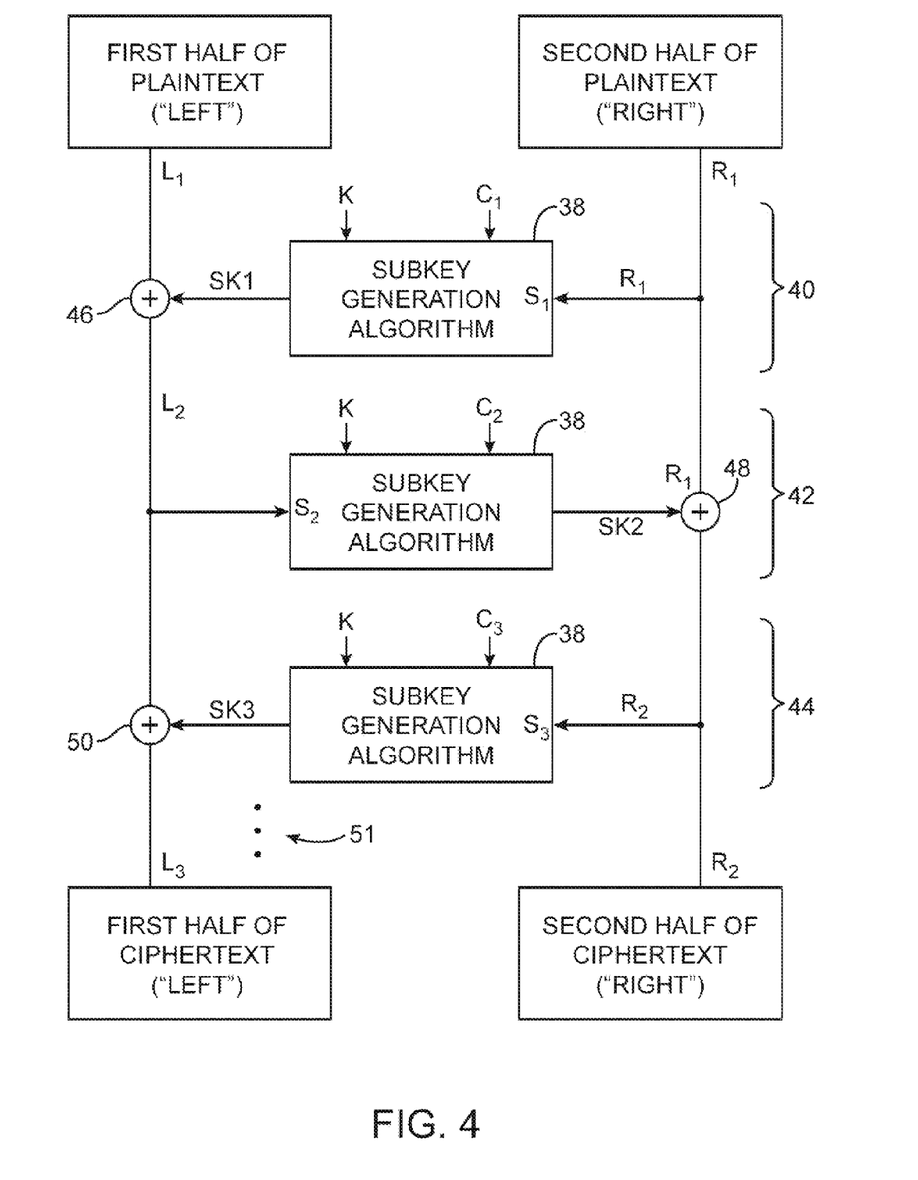
FIG. 4 is a diagram of an illustrative format-preserving block cipher that may be used in a format preserving encryption algorithm that is used as part of a format-translating cryptographic operation in accordance with an embodiment of the present invention.

In FIG. 4, the first half of the unencrypted string is labeled "$L_1$" and the second half of the unencrypted string is labeled "$R_1$". During encryption operations with an FPE engine, the unencrypted string halves $L_1$ and $R_1$ are processed to form corresponding encrypted string halves $L_3$ and $R_2$. During decryption operations with the FPE engine, processing flows from the bottom of FIG. 4 towards the top, so that encrypted string halves $L_3$ and $R_2$ are decrypted to produce unencrypted halves $L_1$ and $R_1$. Processing occurs in three rounds 40, 42, and 44. During encryption, the operations of round 40 are performed first, the operations of round 42 are performed second, and the operations of round 44 are performed third. During decryption, the operations of round 44 are performed first, the operations of round 42 are performed second, and the operations of round 40 are performed third.

As indicated by dots 51 in FIG. 4, the operations of FIG. 4 may, if desired, be implemented using four or more rounds. For example, eight rounds of a block cipher may be performed.

The block cipher structure of FIG. 4 encrypts (or decrypts) a string of a particular known size to produce an output string of the same size. During encryption, plaintext is converted to ciphertext (i.e., the block cipher of FIG. 4 is operated from top to bottom). During decryption, ciphertext is converted to plaintext (i.e., the block cipher of FIG. 4 is operated from bottom to top).

The block cipher uses a subkey generation algorithm 38. The subkey generation algorithm 38 has three inputs: a key K, a constant C ($C_1$ for round 40, $C_2$ for round 42, and $C_3$ for round 44), and a string S ($S_1=R_1$ for round 40, $S_2=L_2$ for round 42, and $S_3=R_2$ for round 44).

The subkey generation algorithm 38 may be a function H' that is based on a cryptographic hash function H and that takes as an input S, C, and K. With one suitable approach, the subkey generation algorithm H' is given by equation 1.

$$H'=H(S|C|K) \tag{1}$$

In equation 1, the symbol "|" represents the concatenation function. The cryptographic hash function H is preferably chosen so that the subkey generation algorithm has a suitable cryptographic strength. Illustrative cryptographic hash functions that can be used for hash function H include the SHA1 hash function and the AES algorithm used as a hash function.

The value of the key K is the same for rounds 40, 42, and 44. The value of the constant C is different for each round. With one suitable arrangement, the constant $C_1$ that is used in round 40 is equal to 1, the constant $C_2$ that is used in round 42 is 2, and the constant $C_3$ that is used in round 44 is 3. The value of S varies in each round. In round 40, $S_1$ is equal to the first half of the unencrypted string $R_1$. In round 42, $S_2$ is equal to the $L_2$. In round 44, $S_3$ is equal to $R_2$.

In round 40, the output of the subkey generation algorithm is subkey SK1, as shown in equation 2.

$$SK1=H(S_1|C_1|K) \tag{2}$$

In round 42, the output of the subkey generation algorithm is subkey SK2, as shown in equation 3.

$$SK2=H(S_2|C_2|K) \tag{3}$$

In round 44, the output of the subkey generation algorithm is subkey SK3, as shown in equation 4.

$$SK3=H(S_3C_3|K) \tag{4}$$

Equations 1-4 involve the use of a cryptographic hash function for the subkey generation algorithm. If desired, the subkey generation algorithm may be implemented using a cryptographic message authentication code (MAC) function. A cryptographic message authentication code function is a keyed hash function. Using a cryptographic message authentication code function, equation 1 would become H'=MACF (S|C,K), where MACF is the message authentication code function. An example of a message authentication code function is CMAC (cipher-based MAC), which is a block-cipher-based message authentication code function. The cryptographic message authentication code function AES-CMAC is a CMAC function based on the 128-bit advanced encryption standard (AES).

A format-preserving combining operation (labeled "+" in FIG. 4) is used to combine the subkeys SK1, SK2, and SK3 with respective string portions.

During encryption operations, format-preserving combining operation 46 combines SK1 with string $L_1$ to produce string $L_2$. During decryption operations, format-preserving combining operation 46 combines SK1 with string $L_2$ to produce string $L_1$. Format-preserving combining operation 48 combines SK2 with string $R_1$ to produce string $R_2$ during encryption operations and combines SK2 with string $R_2$ to produce string $R_1$ during decryption operations. Format-preserving combining operation 50 is used to process subkey SK3. During encryption, format-preserving combining operation 50 combines SK3 with string $L_2$ to produce string $L_3$. During decryption, format-preserving combining operation 50 combines SK3 with string $L_3$ to produce string $L_2$.

The format-preserving combining operation + preserves the format of the strings $L_1$, $L_2$, $L_3$, $R_1$, and $R_2$ as they are combined with the subkeys SK1, SK2, and SK3. For example, the string $L_2$ that is produced by combining string $L_1$ and subkey SK1 has the same format as the string $L_1$.

The format-preserving combining operation + may be based on any suitable mathematical combining operation. For example, the function + may be addition mod x, where x is an integer of an appropriate size (i.e., $x=y^z$, where z is equal to the length of the string S, and where y is equal to the number of possible character values for each character in the string S). If, as an example, the string S contains 16 digits (each digit having one of 10 possible values from 0 to 9), x would be $10^{16}$. If the string S contains three uppercase letters (each uppercase letter having one of 26 possible values from A to Z), x would be $26^3$. These are merely illustrative examples. The format-preserving combining function + may be any reversible logical or arithmetic operation that preserves the format of its string input when combined with the subkey.

During FTE operations, strings that are to be processed may be converted into binary values. Plaintext may, for example, be converted into a corresponding unique binary value (sometimes referred to herein as a UBV). The UBV may be encrypted to produce a corresponding encrypted version of the UBV (i.e., an EUBV). The EUBV value may be a binary representation of the encrypted version of the plaintext (i.e., the EUBV may be a binary representation of the ciphertext). During decryption operations, the EUBV may be decrypted to produce the UBV.

The FPE algorithm of FIG. 4 may be used in encrypting a UBV to produce a corresponding EUBV and may be used in decrypting a EUBV to produce a corresponding UBV. To ensure that the FPE algorithm is successful at preserving the format of a binary-encoded string, care should be taken that the binary values that are produced during encryption and decryption operations are format compliant.

Encoded binary values are considered to be format compliant when their unencoded form lies within an appropriate range (e.g., the same range of values as their original form). Consider, as an example, a single digit such as the character "9". This character can be numerically represented by the base 10 number "9." In binary, the number 9 is 1001. Using a block cipher of the type described in connection with FIG. 4, encryption operations may be performed that transform the unencrypted binary value 1001 to an encrypted value of 1111 (as an example). This binary value is not format compliant, because it corresponds to a base 10 value of "15," which is not within the permissible range for a single digit (i.e., "15" does not lie within the range of "0," "1", "2," . . . "9"). The same type of problem can occur during decryption if the decrypted version of a binary-encoded value is not format compliant.

To ensure that encrypted and decrypted values are format compliant, the block cipher operations of FIG. 4 can be repeated while checking the output of the cipher for format compliance. Each iteration of the block cipher will modify the binary output. Eventually, the binary output of the block cipher will be format compliant, at which point no further iterations of the block cipher are performed.

For example, a certain number of rounds of the block cipher of FIG. 4 (e.g., eight rounds) may be used to perform an initial encryption operation on the binary-encoded value 1001 (in the single-digit scenario). This initial encoding operation results in the binary value of 1111 (in this example). If this value were format compliant, the encryption process would be complete. However, in the present example, the binary value of 1111 is not format compliant, because it corresponds to a base 10 numeric value of 15, which is not within the permissible range numeric values for a digit (i.e., 15 does not lie within the range of 0-9, so the string "15" is not in the same format as the original string "9"). As a result, additional rounds of the block cipher are performed (e.g., an additional eight rounds). This may produce the encrypted binary value 1000 (as an example). Because the binary value 1000 corresponds to a base 10 numeric value of 8, which lies within the permissible digit numeric values of 0-9, the binary value 1000 forms a proper format-compliant encrypted binary-encoded version of string P. No further rounds of the block cipher need be performed.

Decryption operations may be performed in the same way. If, following an initial application of a given number of rounds of the block cipher, the initial binary value of a string that is produced is not format compliant, additional decryption operations can be performed. As soon as a binary output is produced that is format compliant, the block cipher operations may be terminated and the binary value may be converted into an appropriately formatted string of characters (e.g., letters and digits).

In the simple "single digit" example, the format of the string was easily defined. Stings with more than one character or strings that contained non-digit characters did not comply with the "single digit" format. To ensure satisfactory FTE operations in situations in which string formats are potentially much more complex, string formats can be defined using regular expressions.

A regular expression is a set of rules that defines a string format. A regular expression can be used to evaluate whether a given string is format compliant.

A regular expression RE for a valid email address is given in equation 5.

$$RE=[a\text{-}Z]^*@[a\text{-}Z]^*.com \tag{5}$$

As shown by the regular expression of equation 5, a valid email address has a number of lower case or upper case characters followed by an "@" symbol. The * symbol in regular expression RE indicates that there may be any number of characters preceding the "@" symbol. Following the "@" symbol, there may again be a number of characters. These characters are followed by the top level domain (the string ".com"). Regular expressions can be developed for any suitable string format (e.g., social security numbers, account numbers, names, addresses, telephone numbers, birthdates, security codes, passwords, usernames, license numbers, governmental identifiers, organizational identifiers, or other information).

A regular expression can be mapped in a one-to-one fashion to a corresponding deterministic finite automaton (DFA). A DFA is a state machine that can be used in processing a string to evaluate format compliance. A DFA may be represented by a graph having nodes (states) and edges (transitions).

Figure 5:
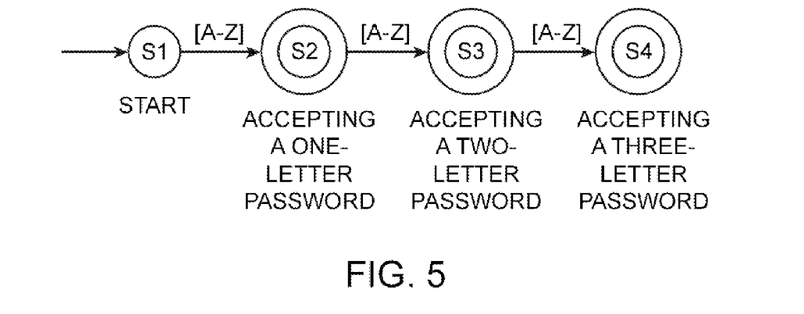
FIG. 5 is a state diagram for an illustrative deterministic finite automaton that requires that strings have a length of one to three letter characters in accordance with an embodiment of the present invention.
Figure 6:
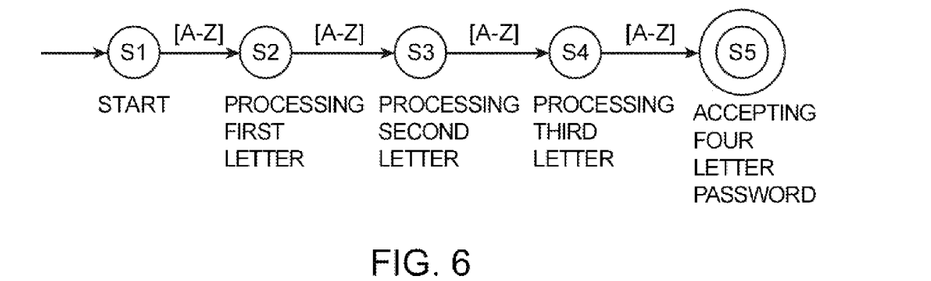
FIG. 6 is a state diagram for an illustrative deterministic finite automaton that requires that strings have a length of four letter characters in accordance with an embodiment of the present invention.

The way in which DFAs can be used to evaluate strings is illustrated by an example in FIGS. 5 and 6. In this example, FIG. 5 contains a DFA (DFAIN) corresponding to a first regular expression (REIN) and FIG. 6 contains a DFA (DFAOUT) corresponding to a second regular expression (REOUT). DFAIN specifies that a password must have from one to three letters to be valid. DFAOUT specifies that a password must have four letters to be valid. The regular expression REIN that corresponds to DFAIN of FIG. 5 is presented in equation 6. The regular expression REOUT that corresponds to DFAOUT of FIG. 6 is presented in equation 7.

$$RE = [A\text{-}Z]^{1-3} \quad (6)$$

$$RE = [A\text{-}Z]^{4} \quad (7)$$

A DFA contains states (represented by circles) and transition functions (represented by lines). During processing of a given input string, processing moves between the states following the rules specified by the transition functions. Valid ending states are called "accept states" and are denoted by two concentric circles.

There are four states in DFAIN of FIG. 5: "start" state S1, "accepting a one-letter password" state S2, "accepting a two-letter password" state S3, and "accepting a three-letter password" state S4. To be considered a valid string, processing of an input string must end on one of the accept states (i.e., one of states S2, S3, and S4 in the example of FIG. 5). If no characters are presented in the input string, processing will end at the start state S1 and, because the start state is not an accept state, this (empty) string will not identified as a valid password of length 1-3. If, as another example, an input string has two letters, processing of the first letter will cause the state to transition from S1 to S2 and processing of the second letter will cause the state to transition from S2 to S3. Because S3 is an accept state, the two-letter string will be deemed to be a valid password of length 1-3.

In DFAOUT of FIG. 6, there are five states: "start" state S1, "processing the first letter of the string" state S2, "processing the second letter of the string" state S3, "processing the third letter of the string" state S4, and "accepting a four-letter password" state S5. To be considered a valid string, processing of an input string must end on accept state S5. If, for example, the string "XYZ" were to be presented to DFAOUT, processing would end on state S4. Because S4 of DFAOUT in FIG. 6 is not an accept state, the string "XYZ" would be deemed not to be a valid password of length 4.

During FTE operations, regular expressions and their corresponding DFAs may be used to translate strings between formats. During FTE encryption, for example, a first regular expression (i.e., REIN) may be used to define the valid format of a plaintext string (i.e., a first format), whereas a second regular expression (i.e., REOUT) that is potentially different than REIN may be used to define a valid format of a ciphertext string (i.e., a second format). During FTE decryption operations, REOUT may be used to define the format of a ciphertext string that is to be decrypted and REIN may be used to define the format in which the resulting plaintext will be produced.

Figure 7:
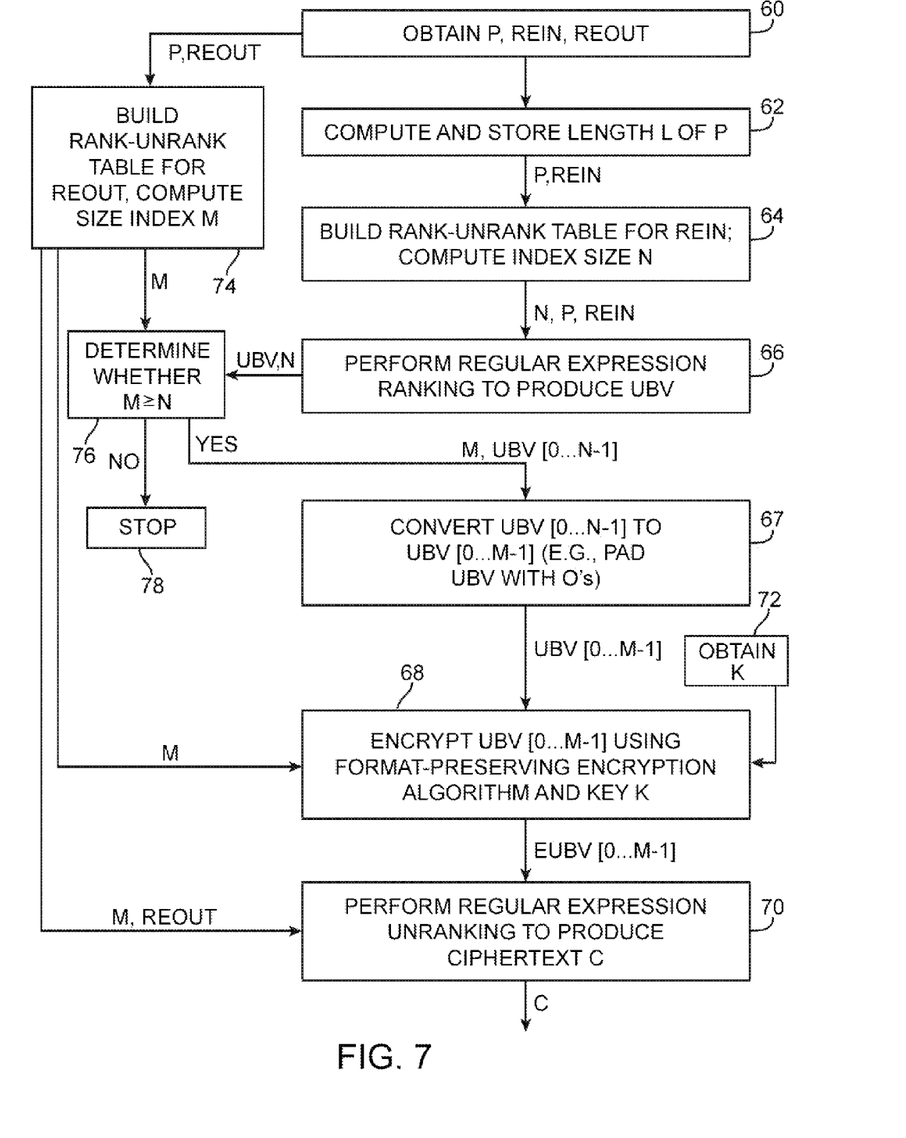
FIG. 7 is a flow chart of illustrative steps involved in performing an encryption operation that translates plaintext to ciphertext in a different format in accordance with an embodiment of the present invention.
Figure 8:
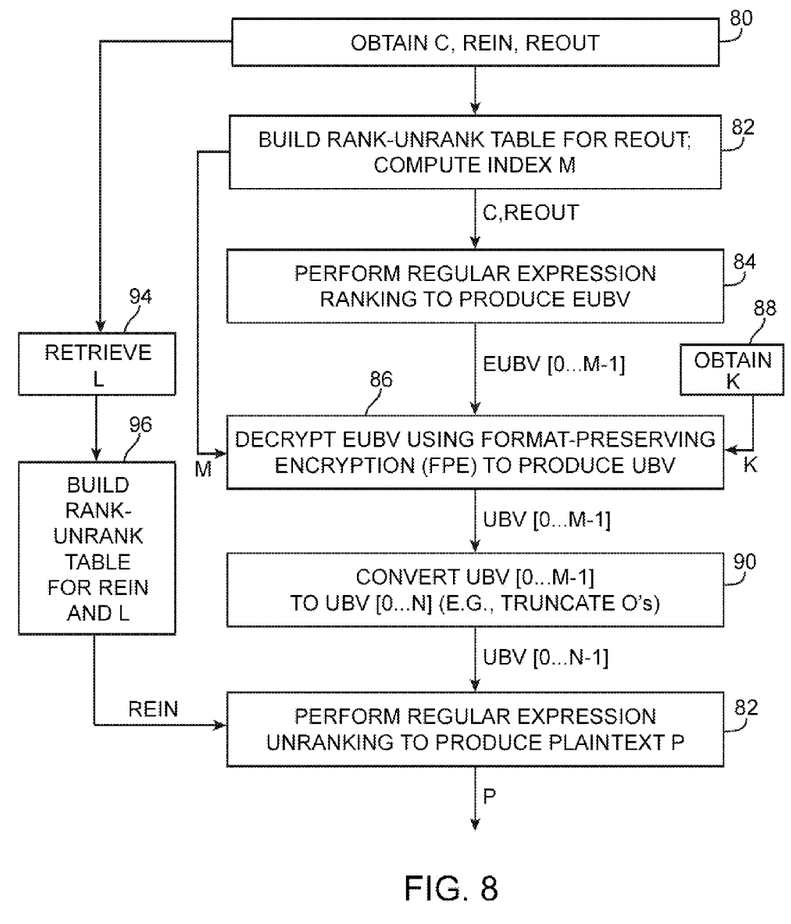
FIG. 8 is a flow chart of illustrative steps involved in performing a decryption operation that translates ciphertext to plaintext in a different format in accordance with an embodiment of the present invention.

Flow charts of illustrative encryption and decryption operations that may be performed by an FTE cryptographic engine in system 10 of FIG. 1 are shown in FIGS. 7 and 8. FIG. 7 shows illustrative operations that may be performed when encrypting a plaintext string P in a format defined by regular expression REIN to form a corresponding ciphertext string C in a format defined by regular expression REOUT. FIG. 8 shows illustrative operations that may be performed when decrypting ciphertext C in a format defined by regular expression REOUT to produce plaintext P in a format defined by regular expression REIN. Because REIN and REOUT need not be the same, strings may be translated from a first format to a second format as part of the encryption process and can be translated from the second format to the first format during the decryption process. As an example, a social security number (plaintext) can be translated to an email address (ciphertext) during encryption and the email address (ciphertext) can be translated to a social security number (plaintext) during decryption. String formats with variable lengths may be used. The formats that are defined by REIN and REOUT can be complex formats such as street addresses, etc.

The FTE encryption operations of FIG. 7 may be performed using format-translating encryption engine 26 of FIG. 2 (e.g., an encryption engine running on computing equipment of the type shown in FIG. 1). The FTE decryption operations of FIG. 8 may be performed using format-translating decryption engine 28 of FIG. 2 (e.g., a decryption engine running on computing equipment of the type shown in FIG. 1). Engines 26 and 28 may process strings of variable lengths. For example, engine 26 may convert multiple plaintext strings of different lengths into respective ciphertext strings that all have the same fixed length. The fixed length may be different (e.g., larger) than the lengths of each of the plaintext strings (as an example).

During the FTE encryption operations of FIG. 7, encryption engine 26 may obtain plaintext P, and regular expression REIN, and regular expression REOUT (step 60).

Plaintext P is a plaintext (unencrypted) string. Regular expressions REIN and REOUT define the formats of the plaintext string and P corresponds to a plaintext string.

During the operations of step 60, plaintext P, regular expression REIN, and regular expression REOUT may be obtained from a user, from storage, from another application, etc. For example, a user may make text entries into a text entry box displayed on a computer screen. Plaintext P may be entered by typing on a keyboard (for example). Regular expressions REIN and REOUT may be entered manually (e.g., by typing regular expression code of the type shown in equation 5 into a text entry box). If desired, graphical entry arrangements may be used (e.g., arrangements in which a user may create a regular expression by manipulating graphical elements in an on-screen DFA). The operations of step 60 may also involve the selection of items in a library or drop-down menu. In some situations, regular expressions such as REIN and REOUT may be embedded into the code of the encryption engine (e.g., as defaults or as selectable options). Combinations of these techniques or other suitable techniques that allow encryption engine 26 to obtain P, REIN, and REOUT may also be used.

After plaintext string P and regular expressions REIN and REOUT have been obtained, the length L of P may be determined from P and may be stored in the storage of the computing equipment of FIG. 1 (step 62).

At step 64, using P and REIN, encryption engine 26 may build a rank-unrank table for REIN and may compute a corresponding index size N. The rank-unrank table is used in performing subsequent indexing operations (i.e., in performing "rank" and "unrank" operations). The rank-unrank table may be stored in the computing equipment of FIG. 1. The value of index N represents the size of the space associated with the format defined by REIN. For example, if REIN defines a format for a password as having one, two, or three letters [A . . . Z], as set forth in the equation 6, the value of N will be $26 + 26^2 + 26^3$, because each of the three letters in the password has 26 possible values.

At step 66, N, P, and REIN (i.e., the rank-unrank table for REIN) are used in performing regular expression ranking operations (i.e., regular expression ranking of P). The regular expression ranking process produces a unique binary value UBV corresponding to plaintext P. The unique binary value that is produced at step 66 is selected from the range 0 . . . N−1.

At step 74, a rank-unrank table for P is built for regular expression REOUT and the corresponding size index N for the REOUT rank-unrank table is computed. The value of index M represents the size of the space associated with the format defined by REOUT. For example, if REOUT defines a format for a password as having four letters [A . . . Z], as set forth in the equation 7, the value of M will be $26^4$, because each of the four letters in the password has 26 possible values.

The value of M is compared to the value of N at step 76. If, at step 76, it is determined that M is less than N, the space available for the encrypted string is less than the unencrypted string, so encryption operations on P will fail and are therefore aborted at step 78. If M is greater than or equal to N, encryption operations may proceed at step 67.

At step 67, a conversion process is performed to convert UBV[0 . . . N−1] to UBV[0 . . . M−1]. With one suitable arrangement, pad zeros are added to the most significant digits in UBV until the UBV has an appropriate number of digits. If, for example, N is 8 (three bits), M is 16 (four bits), and UBV is three bits, a single pad bit (a leading pad zero) is added to the most significant bit of UBV. The operations of step 67 ensure that UBV has the appropriate number of bits to be handled by the block cipher of FIG. 4 or other suitable FPE algorithm.

At step 72, cryptographic key K is obtained (e.g., by retrieving key K from storage, by querying a user for manual input, etc.).

At step 68, the FPE algorithm (i.e., the block cipher of FIG. 4) may be used to encrypt UBV[0 . . . M−1]. The value of key K serves as an input to the FPE algorithm (i.e., K serves as an encryption key in this context). The value of M is used in determining the block size for the block cipher (e.g., if M is 16, the total number of bits to the input of the block cipher will be 4—two of which can be used for left string half L1 and two of which can be used for right string half R1).

At step 70, regular expression unranking operations may be performed on EUBV to produce ciphertext C. The regular expression unranking operations involve use of M and REOUT (i.e., the rank-unrank table for REOUT that was built during the operations of step 74).

Regular expression REIN defines a first format for input string P and regular expression REOUT defines a second format for output string C. The first and second formats may be different (i.e., REIN may not equal REOUT), so the encryption operations of FIG. 7 serve to translate unencrypted string P from the format specified by REIN to encrypted string C in the format specified by REOUT.

Ciphertext C may be stored in a database or on other computing equipment of system 10 in FIG. 1. When desired, ciphertext C may be obtained and decrypted by decryption engine 28 (FIG. 2). Decryption engine 28 implements a format translating encryption (FTE) decryption process. During decryption operations with engine 28, C is decrypted to form P and the format of the string is translated from the format specified by REOUT to the format specified by REIN.

Illustrative operations involved in decrypting ciphertext C using an FTE algorithm are shown in FIG. 8.

At step 80, ciphertext C, and regular expressions REIN and REOUT are obtained by decryption engine 28 (i.e., by retrieval from storage, by manual input, etc.).

At step 82, the decryption engine builds a RE rank-unrank table for regular expression REOUT and computes the corresponding size index M of this table.

At step 84, regular expression ranking operations are preformed on C to produce corresponding encrypted unique binary value EUBV[0 . . . M−1]. During the operations of step 84, the decryption engine uses C and REOUT (i.e., the rank-unrank table for REOUT) as inputs.

At step 88, the decryption engine obtains cryptographic key K. The decryption engine may retrieve K from storage on the computing equipment of FIG. 1, may prompt a user for manual input of K, or may otherwise obtain K.

During step 86, the value of K and EUBV are used as inputs to an FPE decryption algorithm (e.g., the block cipher of FIG. 4 operated from bottom to top). During the operations of step 86, the index M that was produced during the operations of step 82 is used by the FPE algorithm (i.e., to determine the block size for the block cipher of FIG. 4). By using the FPE decryption algorithm at step 86, EUBV[0 . . . M−1] is decrypted to form UBV[0 . . . M−1].

At step 90, UBV[0 . . . M−1] is converted to UBV[0 . . . N−1] (e.g., by truncating an appropriate number of leading 0s from UBV).

The value of L that was stored by the encryption engine at step 62 (FIG. 7) is retrieved by the decryption engine at step 94. At step 96, the decryption engine may build a rank-unrank table for regular expression REIN and L (if desired, rank-unrank tables may be cached by the encryption and decryption engines). The rank-unrank table that is created at step 96 may be used in performing regular expression unranking operations on UBV at step 92. The use of REIN (in the form of the rank-unrank table for REIN) in performing the regular expression unranking operations of step 92 ensures that the unique binary value UBV will be mapped to plaintext P.

The foregoing is merely illustrative of the principles of this invention and various modifications can be made by those skilled in the art without departing from the scope and spirit of the invention.

What is claimed is:

1. A method for performing format translating cryptographic operations using computing equipment, comprising:
    with the computing equipment, obtaining a plaintext version of a string of characters that have a format specified by a first regular expression;
    with the computing equipment, performing regular expression ranking operations on the plaintext version of the string with the first regular expression to produce a unique binary value;
    encrypting the unique binary value to produce a corresponding encrypted unique binary value; and
    performing regular expression unranking operations on the encrypted unique binary value with a second regular expression that is different than the first regular expression to produce an encrypted version of the string that has a format specified by the second regular expression.

2. The method defined in claim 1 wherein encrypting the unique binary value comprises encrypting the unique binary value with a format preserving encryption algorithm.

3. The method defined in claim 2 wherein encrypting the unique binary value with the format preserving encryption algorithm comprises encrypting the unique binary value with a block cipher to produce the corresponding encrypted unique binary value.

4. The method defined in claim 1 further comprising computing and storing a length L of the plaintext version of the string in storage in the computing equipment.

5. The method defined in claim 4 further comprising:
    after encrypting the unique binary value and before decrypting the encrypted version of the string, retrieving the length L from the storage.

6. The method defined in claim 5 further comprising:
using the length L to build a rank-unrank table.

7. The method defined in claim 1 further comprising:
computing a size index for the first regular expression.

8. The method defined in claim 7 further comprising computing a size index for the second regular expression.

9. The method defined in claim 8 further comprising:
comparing the size index for the first regular expression to the size index for the second regular expression.

10. The method defined in claim 9 further comprising:
determining that the size index for the second regular expression is less than the size index for the first regular expression; and
as a result of determining that the size index for the second regular expression is less than the size index for the first regular expression, aborting encryption of the plaintext version of the string.

11. The method defined in claim 1 further comprising:
determining that the size index for the second regular expression is not less than the index for the first regular expression; and
as a result of determining that the size index for the second regular expression is not less than the size index for the first regular expression, proceeding with encrypting the unique binary value to produce the corresponding encrypted unique binary value.

12. The method defined in claim 1 wherein the first format comprises a social security number format and wherein the second format comprises an email format and wherein performing the regular expression unranking operations on the encrypted unique binary value comprises producing an email address.

13. The method defined in claim 1 further comprising:
obtaining a cryptographic key, wherein encrypting the unique binary value to produce the corresponding encrypted unique binary value comprises encrypting the unique binary value with the cryptographic key to produce the corresponding encrypted unique binary value.

14. The method defined in claim 1 further comprising:
after performing the regular expression ranking operations and before encrypting the unique binary value, adding pad zeros to the unique binary value.

15. A method for performing format translating cryptographic operations using computing equipment, comprising:
with the computing equipment, obtaining a ciphertext version of a string of characters that have a format specified by a second regular expression;
with the computing equipment, performing regular expression ranking operations on the ciphertext version of the string with the second regular expression to produce an encrypted unique binary value;
decrypting the encrypted unique binary value to produce a corresponding unique binary value; and
performing regular expression unranking operations on the unique binary value with a first regular expression that is different than the second regular expression to produce a plaintext version of the string that has a format specified by the first regular expression.

16. The method defined in claim 15 wherein decrypting the encrypted unique binary value comprises decrypting the encrypted unique binary value with a format preserving encryption algorithm based on a block cipher.

17. The method defined in claim 16 wherein the plaintext version of the string has a length, the method further comprising:
retrieving the length of the plaintext version of the string from storage in the computing equipment.

18. The method defined in claim 17 further comprising:
using the length retrieved from the storage and the first regular expression in performing the regular expression unranking operations.

19. A method for performing format translating cryptographic operations using computing equipment, comprising:
with a format translating encryption engine implemented on the computing equipment, obtaining a plurality of plaintext strings of different lengths each of which has a format specified by a first regular expression;
with the format translating encryption engine, performing regular expression ranking operations on the plaintext strings with the first regular expression to produce a plurality of corresponding unique binary values;
encrypting each of the unique binary values to produce a plurality of corresponding encrypted unique binary values; and
performing regular expression unranking operations on the plurality of encrypted unique binary values with a second regular expression that is different than the first regular expression to produce a plurality of ciphertext strings at least some of which have different lengths than each of the plaintext strings.

20. The method defined in claim 19 further comprising:
computing and storing a length L for each of the plaintext strings;
computing a size index N for the first regular expression; and
computing a size index M for the second regular expression that is different than the size index N.

* * * * *